(12) United States Patent
Carothers et al.

(10) Patent No.: US 7,987,066 B2
(45) Date of Patent: Jul. 26, 2011

(54) COMPONENTS AND CONFIGURATIONS FOR TEST AND VALUATION OF INTEGRATED OPTICAL BUSSES

(75) Inventors: Daniel N. Carothers, Oro Valley, AZ (US); Richard W. Berger, Woodbridge, VA (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 258 days.

(21) Appl. No.: 12/201,823

(22) Filed: Aug. 29, 2008

(65) Prior Publication Data

US 2010/0057394 A1    Mar. 4, 2010

(51) Int. Cl.
*G01R 27/00* (2006.01)
*G06F 19/00* (2011.01)

(52) U.S. Cl. ........................................................ 702/120
(58) Field of Classification Search .................. 702/117, 702/120
See application file for complete search history.

(56) References Cited

U.S. PATENT DOCUMENTS

| | | | |
|---|---|---|---|
| 4,420,258 A | 12/1983 | Burns et al. | |
| 4,547,072 A | 10/1985 | Yoshida et al. | |
| 4,748,617 A | 5/1988 | Drewlo | |
| 4,811,195 A * | 3/1989 | Evans | 700/4 |
| 4,921,354 A | 5/1990 | SooHoo | |
| 5,066,139 A * | 11/1991 | Soderberg et al. | 714/712 |
| 5,165,001 A | 11/1992 | Takagi et al. | |
| 5,281,805 A | 1/1994 | Sauer | |
| 5,371,591 A | 12/1994 | Martin et al. | |
| 5,430,755 A | 7/1995 | Perlmutter | |
| 5,625,636 A | 4/1997 | Bryan et al. | |
| 5,674,778 A | 10/1997 | Lee et al. | |
| 5,703,989 A | 12/1997 | Khan et al. | |
| 5,736,461 A | 4/1998 | Berti et al. | |
| 5,828,476 A | 10/1998 | Bonebright et al. | |
| 5,834,800 A | 11/1998 | Jalali-Farahani et al. | |
| 6,117,771 A | 9/2000 | Murphy et al. | |
| 6,242,324 B1 | 6/2001 | Kub et al. | |
| 6,306,722 B1 | 10/2001 | Yang et al. | |
| 6,331,445 B1 | 12/2001 | Janz et al. | |

(Continued)

FOREIGN PATENT DOCUMENTS

EP    0 818 693 A1    1/1998

(Continued)

OTHER PUBLICATIONS

Kim, H. et al., "Optical Absorption of Cd 1-x Cox Te Single Crystals", Journal of the Korean Physical Society, Jan. 1999, pp. 65-68, vol. 34, No. 1.

(Continued)

*Primary Examiner* — Cindy Hien-Dieu Khuu
(74) *Attorney, Agent, or Firm* — Vern Maine & Associates; Andrew P. Cernota

(57) ABSTRACT

An apparatus and method is provided for the testing of an optical bus, that method having: loading transmission test data and address information for at least one receiving cell via an electronic bus in a first register; setting a clock rate for the optical bus; employing the optical bus to transmit the test data from the first register to the at least one receiving cell; reading out received test data from the receiving cell via the electronic bus; correlating the received test data from the first register with the transmission test data; analyzing errors in the received data and handling of the received data by the bus.

7 Claims, 3 Drawing Sheets

U.S. PATENT DOCUMENTS

| | | | |
|---|---|---|---|
| 6,387,720 | B1 | 5/2002 | Misheloff et al. |
| 6,400,996 | B1 | 6/2002 | Hoffberg et al. |
| 6,477,285 | B1 | 11/2002 | Shanley |
| 6,580,531 | B1 | 6/2003 | Swanson et al. |
| 6,605,809 | B1 | 8/2003 | Engels et al. |
| 6,677,655 | B2 | 1/2004 | Fitzergald |
| 6,680,495 | B2 | 1/2004 | Fitzergald |
| 6,725,119 | B1 | 4/2004 | Wake |
| 6,738,546 | B2 | 5/2004 | Deliwala |
| 6,785,447 | B2 | 8/2004 | Yoshimura et al. |
| 6,795,622 | B2 | 9/2004 | Forrest et al. |
| 6,850,252 | B1 | 2/2005 | Hoffberg |
| 6,861,369 | B2 | 3/2005 | Park |
| 6,936,839 | B2 | 8/2005 | Taylor |
| 6,959,126 | B1 * | 10/2005 | Lofland et al. ............... 385/16 |
| 6,968,110 | B2 | 11/2005 | Patel et al. |
| 7,006,881 | B1 | 2/2006 | Hoffberg et al. |
| 7,010,208 | B1 | 3/2006 | Gunn, III et al. |
| 7,043,106 | B2 | 5/2006 | West et al. |
| 7,072,556 | B1 | 7/2006 | Gunn, III et al. |
| 7,082,247 | B1 | 7/2006 | Gunn, III et al. |
| 7,103,252 | B2 | 9/2006 | Ide |
| 7,139,448 | B2 | 11/2006 | Jain et al. |
| 7,215,845 | B1 | 5/2007 | Chan et al. |
| 7,218,809 | B2 | 5/2007 | Zhou et al. |
| 7,218,826 | B1 | 5/2007 | Gunn, III et al. |
| 7,251,386 | B1 * | 7/2007 | Dickinson et al. ............... 385/14 |
| 7,259,031 | B1 * | 8/2007 | Dickinson et al. ............... 438/23 |
| 7,272,279 | B2 | 9/2007 | Ishikawa et al. |
| 7,315,679 | B2 | 1/2008 | Hochberg et al. |
| 7,333,679 | B2 | 2/2008 | Takahashi |
| 7,348,230 | B2 | 3/2008 | Matsuo et al. |
| 7,356,221 | B2 | 4/2008 | Chu et al. |
| 7,646,984 | B1 * | 1/2010 | Ho et al. ............... 398/154 |
| 7,747,173 | B1 * | 6/2010 | Ho et al. ............... 398/154 |
| 7,853,101 | B2 * | 12/2010 | Carothers ............... 385/24 |
| 2003/0020144 | A1 | 1/2003 | Warble et al. |
| 2003/0026546 | A1 | 2/2003 | Deliwala |
| 2003/0183825 | A1 | 10/2003 | Morse |
| 2004/0146431 | A1 | 7/2004 | Scherer et al. |
| 2004/0190274 | A1 | 9/2004 | Saito et al. |
| 2005/0094938 | A1 | 5/2005 | Ghiron et al. |
| 2005/0259932 | A1 * | 11/2005 | Nagayama et al. ............... 385/123 |
| 2006/0105509 | A1 | 5/2006 | Zia et al. |
| 2006/0158723 | A1 | 7/2006 | Voigt et al. |
| 2006/0238866 | A1 | 10/2006 | Von Lerber |
| 2006/0240667 | A1 | 10/2006 | Matsuda et al. |
| 2007/0116398 | A1 | 5/2007 | Pan et al. |
| 2007/0122148 | A1 | 5/2007 | Welch et al. |
| 2007/0202254 | A1 | 8/2007 | Ganguli et al. |
| 2008/0013957 | A1 * | 1/2008 | Akers et al. ............... 398/115 |
| 2008/0159751 | A1 | 7/2008 | Matsui et al. |
| 2008/0165371 | A1 * | 7/2008 | Tanaka ............... 358/1.3 |
| 2008/0240180 | A1 | 10/2008 | Matsui et al. |

FOREIGN PATENT DOCUMENTS

| | | |
|---|---|---|
| EP | 1 067 409 A2 | 1/2001 |
| WO | 93/14514 | 7/1993 |
| WO | 01/27669 A1 | 4/2001 |
| WO | 02/16986 A1 | 2/2002 |
| WO | 2004/088724 A2 | 10/2004 |
| WO | 2007/149055 A1 | 12/2007 |

OTHER PUBLICATIONS

Roth, Jonathan Edgar, "Electroabsorption Modulators for CMOS Compatible Optical Interconnects in III-V and Group IV Materials", Stanford University, Aug. 2007, 209 pp.

Pruessner, Marcel W. et al., "InP-Based Optical Waveguide MEMS Switches with Evanescent Coupling Mechanism", Journal of Microelectromechanical Systems, Oct. 2005, pp. 1070-1081; vol. 14, No. 5.

IBM TBD; "Integrated Process for Silicon Nitride Waveguide Fabrication"; IBM Technical Disclosure Bulletin, Jul. 1990, pp. 156-157.

Matsushita, A. et al., "Narrow $CoSi_2$ Line Formation on $SiO_2$ by Focused Ion Beam", IEEE, 1999, pp. 861-864.

Kimerling, L.C. et al., "Electronic-Photonic Integrated Circuits on the CMOS Platform", Silicon Photonics, 10 pages, vol. 6125.

Liu, Jifeng et al., "Design of Monolithically Integrated GeSi Electro-Absorption Modulators and Photodetectors on an SOI Platform", Optics Express, 2007, pp. 623-628, vol. 15, No. 2.

Fijol, J.J. et al., "Fabrication of Silicon-On-Insulator Adiabatic Tapers for Low Loss Optical Interconnection of Photonic Devices", SPIE, 2003, 14 pgs.

Yap, D. et al., "Integrated Optoelectronic Circuits with InP-Based HBTs", Optoelectrical Integrated Circuits and Packaging V, Proceedings of SPIE, 2001, pp. 1-11, vol. 4290.

Roth, Jonathan Edgar, "Electroabsorption Modulators for CMOS Compatible Optical Interconnects in III-V and Group IV Materials", Submitted to the Dept. of Electrical Eng. and the Committee on Graduate Studies of Stanford University, Aug. 2007, 207 pgs.

Okyay, Ali K. et al., "Silicon Germanium CMOS Optoelectronic Switching Device: Bringing Light to Latch", IEEE Transactions on Electron Devices, 2007, pp. 3252-3259, vol. 54, No. 12.

McAulay, Alastair D., "All-Optical Switching and Logic with an Integrated Optic Microing Resonator", Proc. of SPIE, 2005, pp. 16-22, vol. 5814.

Chao, Fang-Lin et al., "Analysis of Temperature Profiles of Thermo-Optic Waveguides", Fiber and Integrated Optics, 1994, pp. 397-406, vol. 13.

Kik, P.G. et al., "Erbium Doped Optical Waveguide Amplifiers on Silicon", MRS Bulletin, Apr. 1998, 7 pgs.

"Chapter 13: Process Integration", National Tiapei University of Technology.

L.C. Kimerling et al., "Electronic-Photonic Integrated Circuits on the CMOS Platform", Joint Report sponsored under Defense Advanced Research Projects Agency's EPIC Program and executed by the Microsystems Technology Office, ARPA Order No. T239/03, Program code 4H20 (no date of publication), pp. 1-10.

J.S. Kimmet, "Chapter 6—Integrated Circuit Fabrication Details", M.S. Thesis, 18 pgs.

PCT Search Report dated Oct. 29, 2009 of Patent Application No. PCT/US09/55195 filed Aug. 27, 2009.

* cited by examiner

COMPONENTS AND CONFIGURATIONS FOR TEST AND VALUATION OF INTEGRATED OPTICAL BUSSES

FIELD OF THE INVENTION

This invention relates to the field of test components for photonic communications devices and more particularly to a test for a system to allow the transfer of data between an optical bus and electrical components having different clock speeds.

BACKGROUND OF THE INVENTION

Optical busses operate at high bus speeds, unmatched by even the most advanced electronic components. The pairing of such electrical devices with optical devices can lead to latency and conflicts. As optical busses evolve to operate at data rates beyond the capability of current characterization equipment, there is a need to develop test and evaluation methods that allow accurate characterization while decoupling the characterization from electronic test equipment and methods that will induced their own lag and latency to the measurements.

The biggest challenge with employing an all optical bus is that the clock speed of the optical bus. For example the real on chip digital clock rates today are 2-4 GHz. As technology evolves, electronic clock rates may reach a staggering 10-12 GHz. This is still a fraction of the 40-120 GHz clock rates that an all optical bus should be able to obtain. This fractional variation in clock rate induces a lag in the write/read cycle if the information is taken directly from the electronic component to the optical bus.

SUMMARY OF THE INVENTION

One embodiment of the present invention provides a method for the testing of an optical bus, that method comprising: loading transmission test data and address information for at least one receiving cell via an electronic bus in a first register; setting a clock rate for the optical bus; employing the optical bus to transmit the test data from the first register to the at least one receiving cell; reading out received test data from the receiving cell via the electronic bus; correlating the received test data from the first register with the transmission test data; analyzing errors in the received data and handling of the received data by the bus.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION

Figure 1:
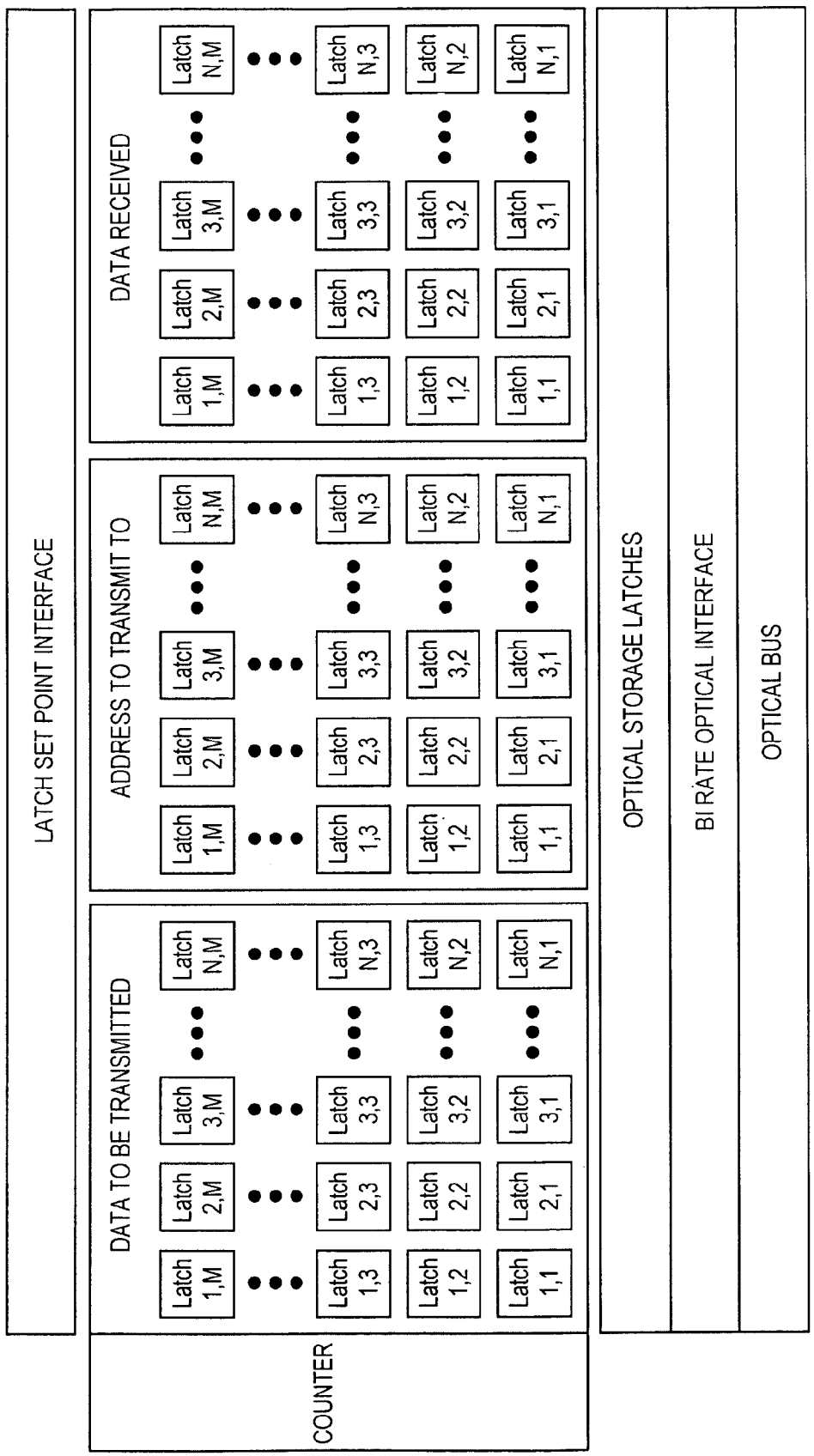
FIG. 1 is a block diagram illustrating a basic high speed FIFO core configured in accordance with one embodiment of the present invention.

One embodiment of the present invention provides an apparatus for testing an architecture that employs an intermediary for the rapid transfer to and from an optical bus, while allowing the same information to be transferred to and from the electronic components at their own more leisurely clock cycle. One example of such architecture is illustrated in FIG. 1 illustrates a basic high speed FIFO core used to characterize and demonstrate an optical bus. To enable lower clock rate electronic components to fully interface the high speed optical bus without introducing a limitation based on their much slower clock speed such an embodiment utilizes an optical latch that will allow information to be loaded from the optical bus. To realize this type of optical storage element two non-linear interferometers creating an optical R-S flip-flop or optical latch are employed.

In such an embodiment, an optical latch is triggered on by the set pulse. Later in the cycle, it is triggered off by a reset pulse which allows the output from the much faster optical bus to be brought into a cell without slowing it down. In embodiments utilizing a second Latch the gating of information to the bus can be controlled at a much greater rate of operation than could be achieved with the electronic component alone, and such a configuration will allow storage and rapidly gating information to optical components.

In one embodiment of the present invention, the electronic component writes a state to the optical latch. Once the bus comes active the information is rapidly clocked into the optical bus through the second latch. Slightly simpler output architecture can be achieved by running the output of the latch through an optically addressed bus switch. This can be further extended by combining latches to achieve a serial to parallel converter to rapidly burst in data serially at each wavelength.

One embodiment of the present invention provides a simple method to illustrate all the key principles, of intra-chip photonic networks, necessary for application in various multi-processor architectures. In addition, through application of varying numbers of these cells such an embodiment allows a user to demonstrate the scaling of these technologies as well.

Figure 2:
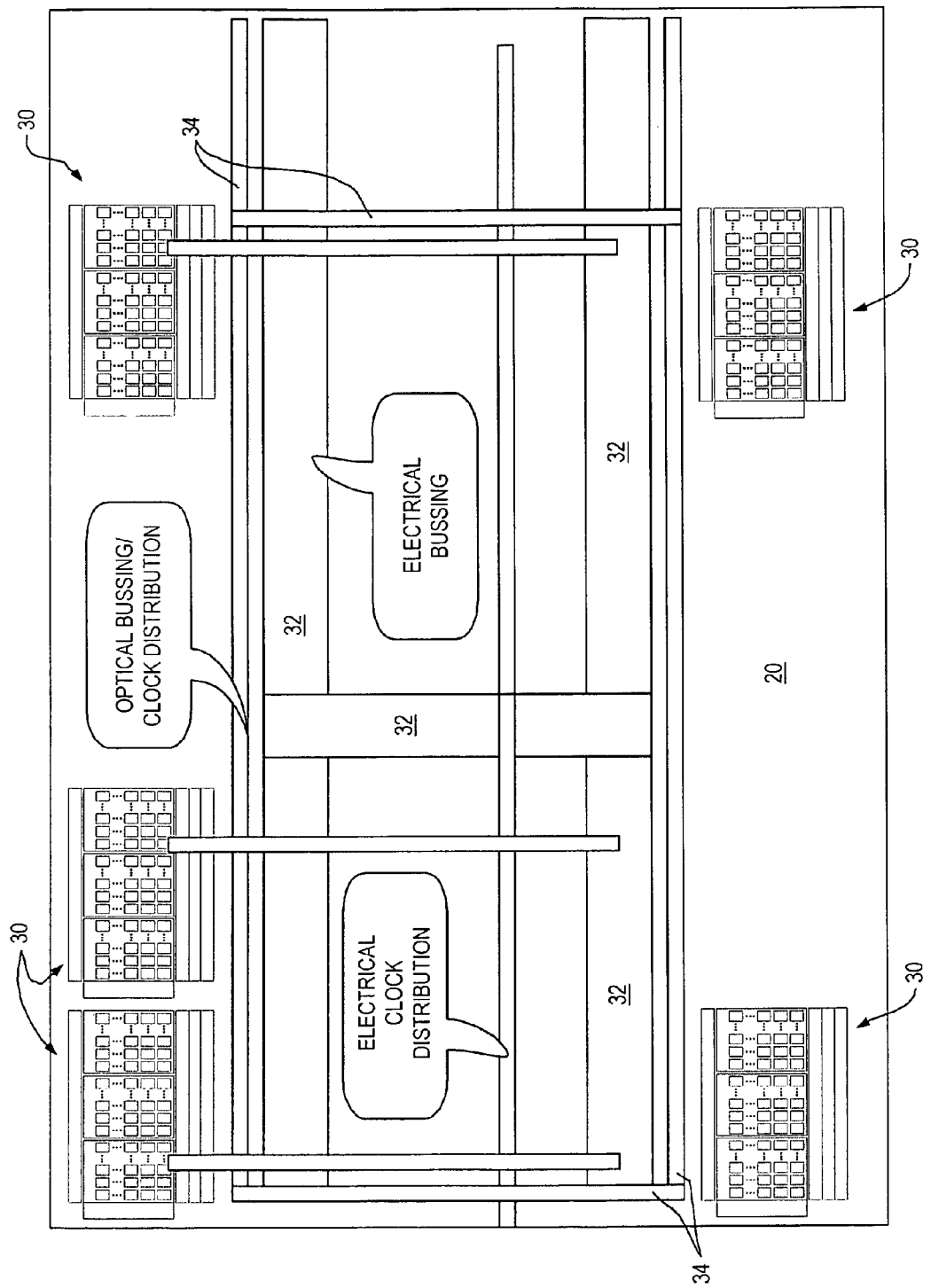
FIG. 2 is a block diagram illustrating a system for the testing of an optical bus configured in accordance with one embodiment of the present invention.

An example of the one embodiment of the present invention, illustrated in FIG. 2 includes a large photonic ASIC 20, in one embodiment, 18 mm by 18 mm, is manufactured with a set of first-in-first-out (FIFO) registers 30 at each corner of the die as well as physically adjacent to one another. These registers 30 will be connected to both electrical 32 and optical buses 34 to measurably illustrate the power-performance gains possible through migration to optical bussing.

The optical busses 34, in such an embodiment, will also employ optical clock distribution and will be capable of greater than 1 TB/s transfer rates. Both electrical 32 and optical busses 34 will be organized to allow both point-to-point and broadcast data transfers in either direction, and will cross over each other to demonstrate the flexibility of the tested optical technology.

External to the ASIC 20, data will be sourced and captured by large RAMs (not illustrated), to confirm data transfer and capture bit error rate (BER) information, and to allow transfer of mass amounts of data.

Figure 3:
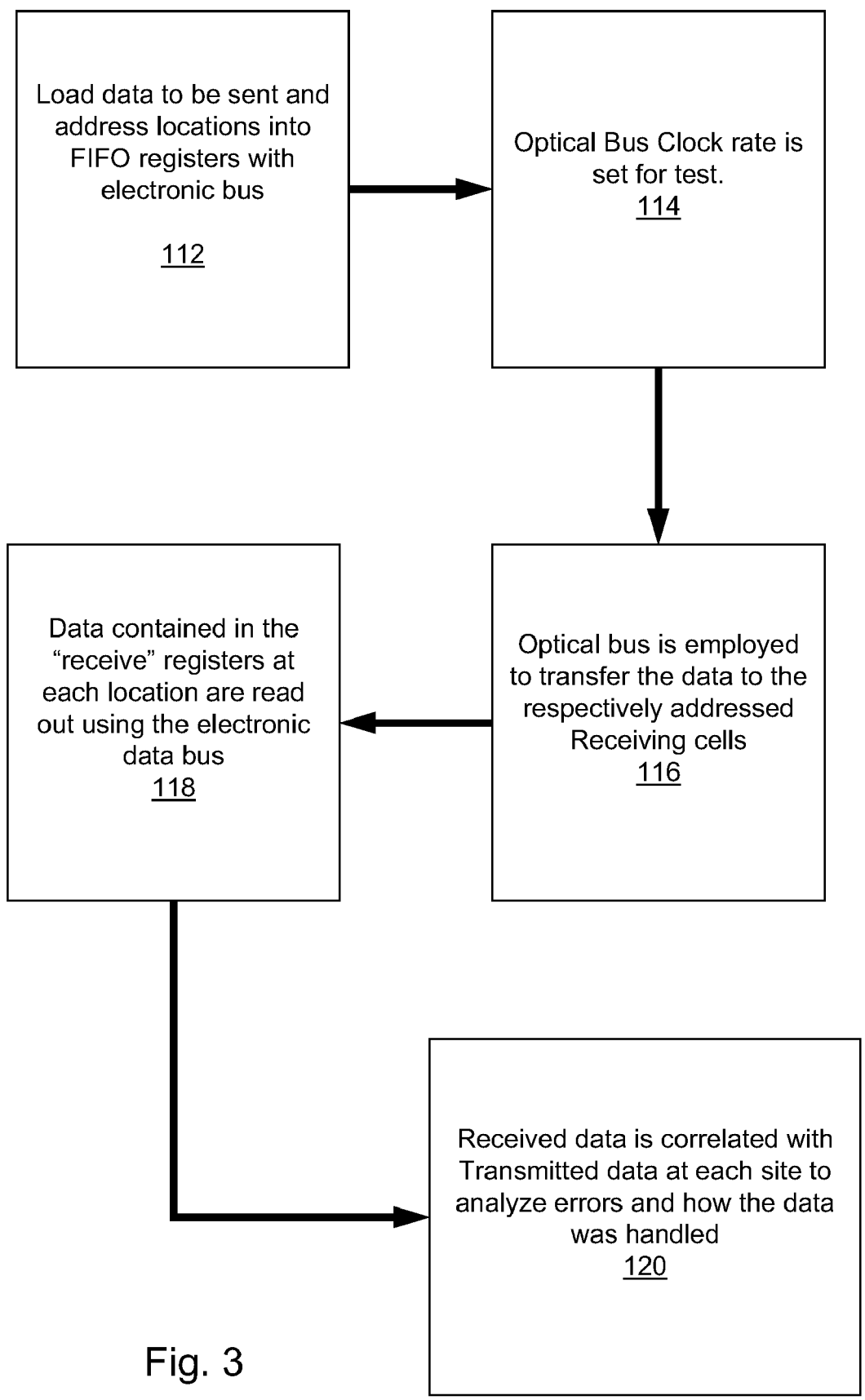
FIG. 3 is a flow chart illustrating a method for the testing of an optical bus configured in accordance with one embodiment of the present invention.

As illustrated in FIG. 3 one embodiment of the present invention provides a method for testing an optical bus. Load data to be sent and address locations are loaded into a plurality of first in first out (FIFO) registers with an electronic bus. 112 The optical bus clock rate is set to a desired test level. 114 The optical bus is employed to transfer data to the respectively addressed receiving cells. 116 The data contained in the receiving cells is read out using the electronic data bus. 118 The data received by the receiving cells is correlated with transmitted data at each site to analyze errors and how the data was handled. 120

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for the testing of optical buses, the system comprising:
    a plurality of optical registers disposed on a ASIC;
    an optical bus to be tested linking and providing addressed data to optical registers in said plurality of optical registers; and
    an electrical bus for readout of data contained in said optical registers, connecting said optical registers in said plurality of optical registers;
    wherein said optical registers are optical latches.

2. The system according to claim 1 wherein said ASIC is a photonic ASIC.

3. The system according to claim 1 wherein said optical bus employs optical clock distribution.

4. The system of claim 1 wherein said optical bus is configured for both point to point and broadcast data transfer.

5. The system according to claim 1 wherein said electrical bus is configured for both point to point and broadcast data transfer.

6. The system according to claim 1 wherein said linking and providing addressed data to optical registers in said plurality of optical registers allow confirmation of data transfer, bit error rate information collection, and mass data transfer.

7. The system according to claim 1 wherein said optical registers are optical first in first out registers.

* * * * *